R. J. WALKER & N. C. SPRAGUE.
COOKER.
APPLICATION FILED MAR. 30, 1910.
990,689.
Patented Apr. 25, 1911.
2 SHEETS—SHEET 1.
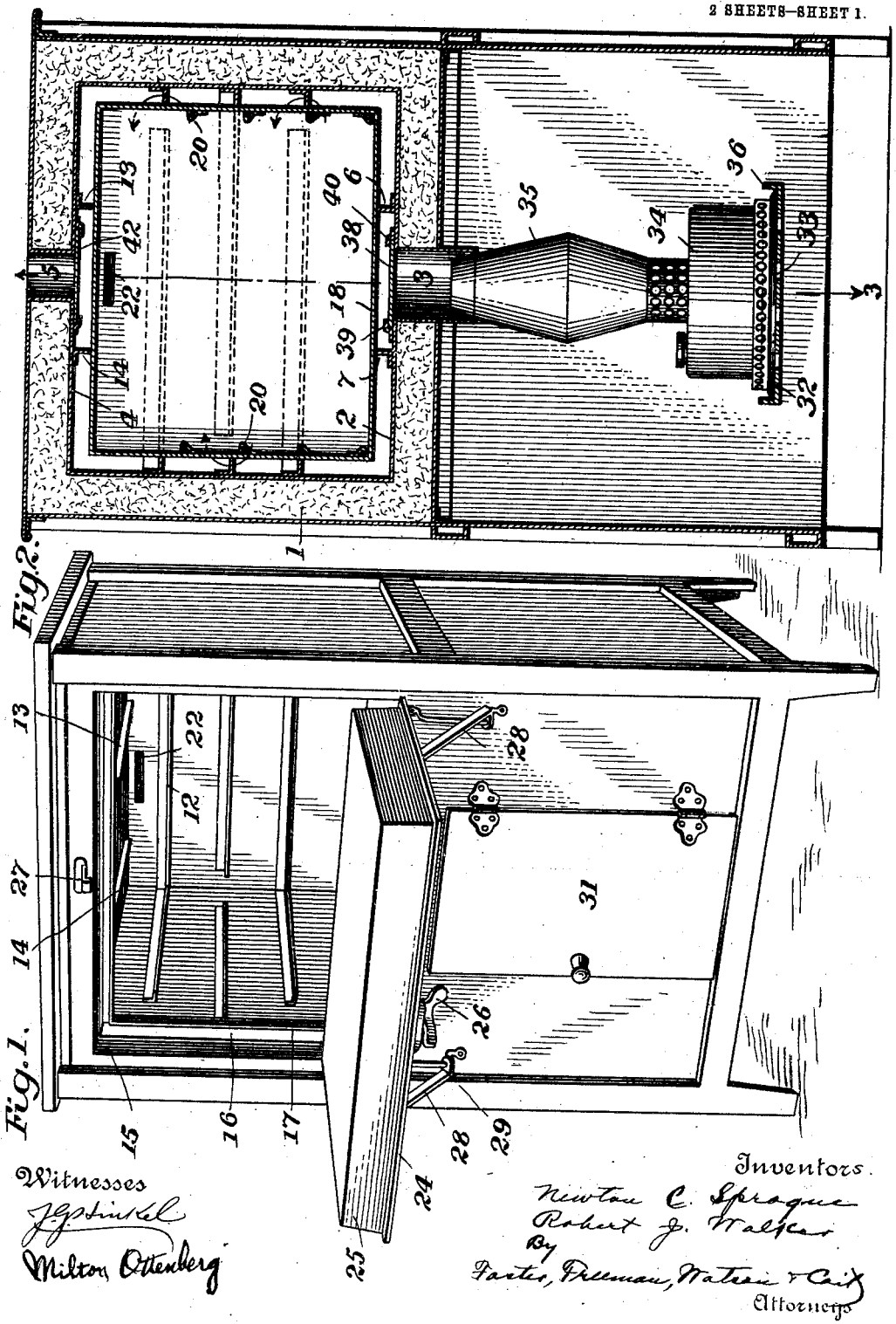

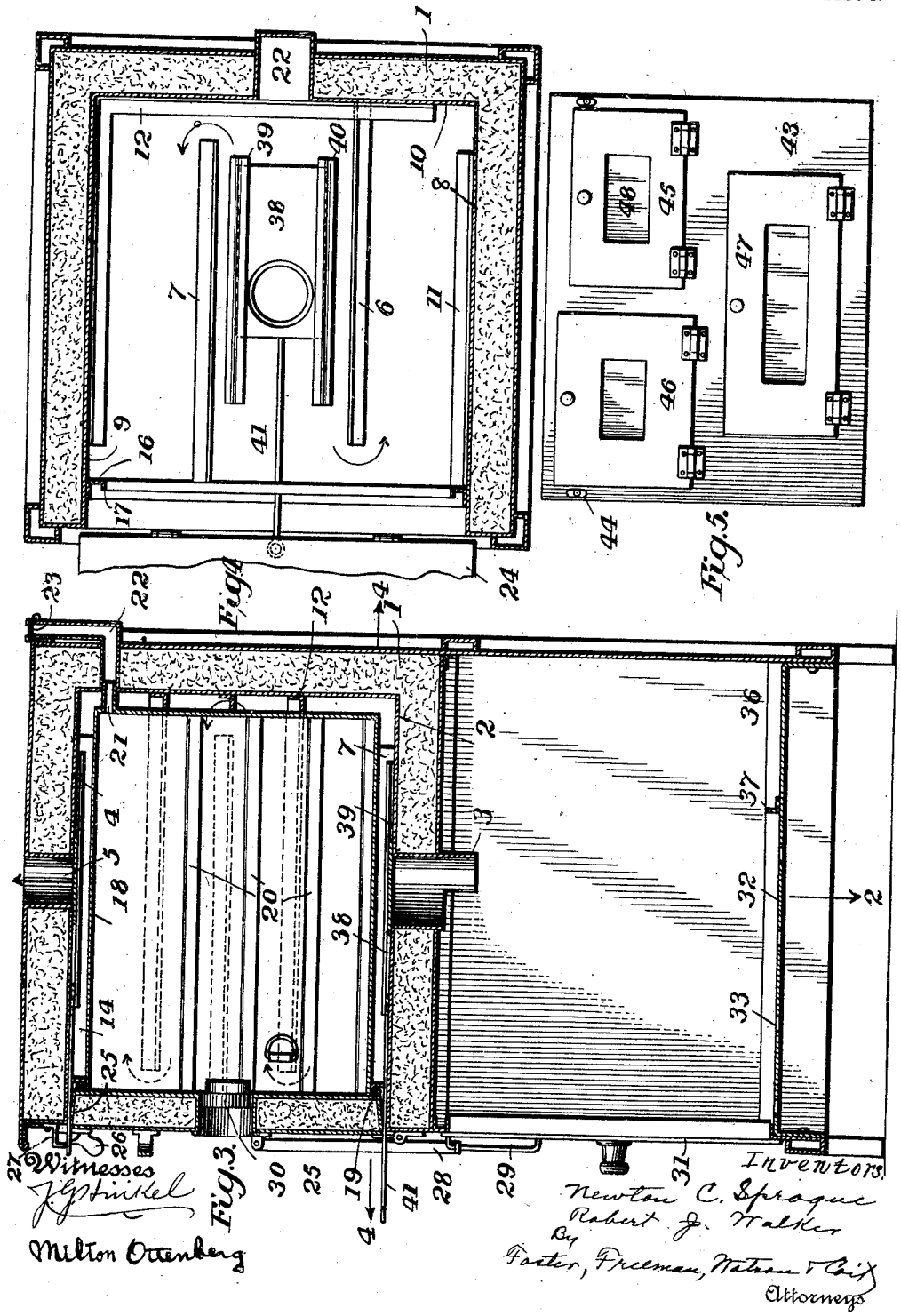

UNITED STATES PATENT OFFICE.

ROBERT J. WALKER AND NEWTON C. SPRAGUE, OF FORT DODGE, IOWA; SAID SPRAGUE ASSIGNOR TO W. S. PEASE, OF FORT DODGE, IOWA.

COOKER.

990,689. Specification of Letters Patent. Patented Apr. 25, 1911.

Application filed March 30, 1910. Serial No. 552,401.

*To all whom it may concern:*

Be it known that we, ROBERT J. WALKER and NEWTON C. SPRAGUE, citizens of the United States, and residents of Fort Dodge, in the county of Webster and State of Iowa, have invented certain new and useful Improvements in Cookers, of which the following is a specification.

This invention relates to cookers, and the device embodying it is of such construction that it will so conserve the heat, as to render it possible to do all ordinary cooking by the use of a single ordinary burner. It also embodies features which adapt it for use at times as a so-called "fireless cooker".

The objects of the invention are to so construct and arrange the parts as to make a neat and compact device having an attractive appearance, and to accomplish the cooking with the least possible waste of the heat from an ordinary burner or lamp.

Other objects are to so simplify the construction and arrangement of the various parts as to make it easy to construct, operate and clean the device.

With these objects in view the invention consists in the novel features of construction which will be apparent from the following description taken in connection with the accompanying drawings.

In the drawings,—Figure 1 is a perspective view of a device embodying the features of our invention with the oven removed; Fig. 2 is a sectional view on the line 2—2 of Fig. 3; Fig. 3 is a section taken on the line 3—3 of Fig. 2; Fig. 4 is a transverse section taken on the line 4—4 of Fig. 3; and Fig. 5 is a plan view of a removable door which may be used with our oven.

As shown particularly in Fig. 1, the apparatus is preferably embodied in a casing made in the shape of a cabinet having somewhat the appearance of a refrigerator. This casing is preferably made of metal such as steel, and may be so painted as to have an ornamental appearance. The upper part of the casing is made into a rectangular chamber having double walls, the space between the walls being filled with any suitable heat insulating material 1. The double walls are preferably made of metal and the bottom wall 2 has in the center thereof an inlet opening provided with a tube 3 for the purpose of admitting to the chamber the products of combustion from a burner. This tube and inlet may be of any shape desired in accordance with the kind of burner which is to be used. The top wall 4 has an outlet 5 which is preferably arranged in the center, although it will be understood that this outlet may be placed at any suitable position so as to carry out the products of combustion from the top of the chamber.

As shown in Fig. 4 baffle plates 6 and 7, preferably made in the form of small angle irons, are placed on opposite sides of the inlet tube 3, and extend from the front of the chamber toward the rear wall. The plate 6 terminates so as to leave a passage around its end in the front of the chamber, and the plate 7 so terminates as to leave a passage around its end toward the rear of the chamber. Around the chamber and secured to the side walls 8, 9 and rear wall 10 we place a series of baffle plates similar to those on the bottom of the chamber. As shown in Fig. 4, the first one of the series above the bottom is made in two sections 11 and 12, the section 11 extending on one side from the front to a point near the rear corner on that side, and the plate 12 extending around the other rear corner, leaving small passages at its ends. It will thus be seen that the two passages through the baffle plate are at opposite corners. The next baffle plate of the series is arranged with the passages at opposite corners, but those corners are different from and at right angles to the first mentioned passages, so that the products of combustion will be compelled to take a tortuous course. On the upper wall of the chamber we place two baffle plates 13, 14, arranged in the same way as those on the bottom wall. Within the door opening 15 of the chamber we place the plate or rim 16, which extends from the walls inwardly a distance equal to the width of the baffle plates and which has the out-turned flange 17.

An oven 18 having an open front fits within the chamber above described through the door opening 15, and it may slide easily into place, making contact with the baffle plates which, as above described, are arranged parallel to its motion. This oven is of such size that it will fit against the baffle plates on all sides, and at its outer end there is a flange 19 which may be integral with the material of the oven as shown. This flange has an in-turned end fitting over the flange 17 on the plate 16. This makes a tight joint preventing the escape of heat and products of combustion. The oven is provided on its interior with the supporting ribs or brackets 20 to carry the ordinary cooking shelves.

In order to permit the escape of fumes and moisture from the oven we provide an outlet 21 in the upper portion which may be arranged in any suitable way. As shown in Fig. 3 it may be made in the form of a flattened tube extending a short distance from the rear wall of the oven at the upper portion in line with its motion and so arranged as to fit into the outlet flue 22 in the rear wall of the casing. This arrangement permits the oven to be easily withdrawn and at the same time makes sure that this vent outlet shall register with the flue in the chamber. The upper end of the flue 22 may be provided with a closure 23. A door 24 is preferably hinged at the bottom in the door opening 15, and is made up of double walls having heat insulating material between them. The edges of the door 25 fit closely the walls of the door opening 15 so as to make a tight joint for the purpose of retaining the heat in the chamber. An ordinary locking fastener 26 engaging lug 27 may be used for holding the door shut and for giving it a slight wedging action. The door is preferably supported when in its lowered position by the pivoted arms 28 having sliding connection at their lower ends with the vertical rods 29, and the door may be provided with a thermostat 30 to indicate the temperature within the chamber. It will be observed that the door above described closes both the chamber and the oven.

The lower part of the main casing of our apparatus preferably has the metal outer walls corresponding to those of the upper part, but in this instance they need not be made double with the insulating material between them. A door 31 is provided for the purpose of giving access to the lower part of the casing and extending inwardly from the door there is a plate 32 which is preferably made of metal having perforations 33 therein, and which is adapted to support an ordinary lamp 34 in such position that its chimney 35 will enter or be directly beneath the inlet opening 3. The plate 33 has the side flanges 36 and the cross flange 37 for the purpose of guiding and positioning the lamp which is used for heating. While we have shown an ordinary oil lamp as furnishing the heat for the device, it will be understood that any form of gas or oil burner may be used. When the lamp is used the front side of the inlet tube 3 is cut away below the bottom of the chamber so as to permit the lamp to slide into position.

It will be observed from the construction above described that the products of combustion from the lamp 34 pass up into the inlet 3 and are there divided, part of them passing around the baffle plate 6 and part around the baffle plate 7, and they thus follow two tortuous courses up around the oven, meeting at the outlet 5 and passing over all points of the oven. We have found that with this construction, and the use of the heat insulating chamber, it is possible for us to do all ordinary cooking with the use of a small burner such as an ordinary oil lamp, and that by the use of such a lamp a turkey may be roasted in the apparatus within a comparatively short time.

While the apparatus above described renders it possible to cook with a very small amount of heat and consequently with small expense, we have found that the time during which it is necessary to operate the burner may be considerably reduced by closing the outlet or the outlet and inlet of the chamber, so that the heat which is in the apparatus will be retained and will continue the cooking operation as in a fireless cooker without the application of further heat. We have devised a construction by which the inlet and outlet may be closed without opening the chamber at all, and consequently without admitting any cold air to the apparatus.

As shown in the drawings, the closure which we preferably use for the inlet 3 consists of a plate 38 adapted to slide over the opening 3 and working against the guides 39, 40. This plate may be operated by any suitable means from outside of the chamber, and we have shown a rod 41 connected to it and extending out beneath the door so that it can be grasped by the hand and pulled forward or pushed back. A similar sliding closure 42 is used for the outlet 5, and it is operated in the same way. It will be understood that our invention is not limited to the particular form of closure for the inlet and outlet.

It is sometimes desirable to use the oven in such a way that access may be had to the things being cooked in it, and in that case it is necessary to have the main door 24 open. This however would leave the entire front of the oven open, and to avoid this we use a supplemental or removable door 43 shown in Fig. 5 which may be placed within the door opening, and secured in place by pins or catches 44. This supplemental door is preferably made of a single thickness of metal and is provided with a series of hinged doors 45, 46, 47 which can be separately and independently opened so as to give access to different parts of the oven. Each of these separate doors may be provided with a transparent panel 48 so as to permit inspection of the articles in the oven without opening the supplemental doors. It will be understood that the supplemental door 43 is used only when the main door 24 is not in operation.

Having thus described the invention, what is claimed is:

1. In a device of the class described, the combination with a cabinet casing, of means for supporting a burner in the lower portion of said casing, a chamber having insulating walls in the upper portion thereof, the bottom wall being provided with a passage for the products of combustion from said burner, baffle plates on the bottom, top, side and rear walls of said chamber, an outlet for products of combustion at the top of said chamber, an oven in said chamber fitting against said baffle plates, and a door containing insulating material for said chamber and oven.

2. In a device of the class described, the combination with a chamber having insulating walls provided with an inlet at the bottom and an outlet at the top, of upright baffle plates on the bottom of said chamber on opposite sides of said inlet, a series of baffle plates extending around the side and rear walls and having passages therethrough at opposite corners of the chamber, the passages through adjacent plates of the series being at different corners, an oven in said chamber fitting against said baffle plates, and a door for said chamber and oven.

3. In a device of the class described, the combination with a chamer provided with a centrally arranged inlet at the bottom and an outlet at the top, of an oven within said chamber spaced therefrom leaving passages therearound, upright, longitudinal baffle plates on the bottom of said chamber between it and said oven having passages therethrough at opposite ends, a series of baffle plates extending around the sides and back of said chamber, each plate being provided with two openings therethrough at opposite points of the chamber and the openings in adjacent plates being staggered, whereby the products of combustion entering the inlet will be divided and pass in a tortuous course up both sides of the chamber, the oven within said chamber fitting against said plates.

4. In a device of the class described, the combination with a chamber having heat insulated walls with an inlet at the bottom and an outlet at the top, of a heat insulated door closing one side of said chamber, baffle plates on the bottom and side walls of said chamber, an oven having an open front adapted to removably slide into said chamber in contact with said baffle plates, and a marginal flange connecting said oven and chamber walls within the door opening.

5. In a device of the class described, the combination with a chamber, of a door closing one side thereof, a removable oven having an open end adapted to slide into said chamber and spaced from the walls thereof, and baffle plates spanning the space between said oven and the walls of said chamber, the said baffle plates extending in the direction in which said oven slides so as to act as guides.

6. In a device of the class described, the combination with a chamber, of a door closing one side thereof, a removable oven having an open end adapted to slide into said chamber and spaced from the walls thereof, baffle plates spanning the space between said oven and the walls of said chamber, and interlocking flanges surrounding the open end of said oven when in place connecting it with the walls of said chamber.

7. In a device of the class described, the combination with a chamber, of a door closing a door opening at one side thereof, a removable oven having an open end adapted to slide into said chamber, a narrow inwardly extending plate within said door opening having an outwardly turned flange, and a marginal flange at the open end of said oven having its edge turned inwardly away from said open end to interlock with the flange on said platen to constitute a tight closure for the space between the oven and the chamber walls.

8. In a device of the class described, the combination with a chamber, of a door closing one side thereof, a removable oven having an open end adapted to slide into said chamber, baffle plates spanning the space between said oven and the walls of said chamber, and interlocking flanges surrounding the open end of said oven when in place connecting it with the walls within the outer open end of said chamber.

In testimony whereof we affix our signatures in presence of two witnesses.

ROBERT J. WALKER.
NEWTON C. SPRAGUE.

Witnesses:
W. S. PEASE,
B. B. BURNQUIST.

---

Copies of this patent may be obtained for five cents each, by addressing the "Commissioner of Patents, Washington, D. C."